(12) United States Patent
White et al.

(10) Patent No.: US 7,194,506 B1
(45) Date of Patent: Mar. 20, 2007

(54) METHOD AND SYSTEM FOR CACHE MANAGEMENT OF LOCALE-SENSITIVE CONTENT

(75) Inventors: Eric White, Austin, TX (US); Puhong You, Austin, TX (US); Isaac Rajkumar, Austin, TX (US)

(73) Assignee: Vignette Corporation, Austin, TX (US)

( * ) Notice: Subject to any disclaimer, the term of this patent is extended or adjusted under 35 U.S.C. 154(b) by 906 days.

(21) Appl. No.: 10/027,384

(22) Filed: Dec. 21, 2001

Related U.S. Application Data

(60) Provisional application No. 60/257,387, filed on Dec. 21, 2000.

(51) Int. Cl.
G06F 15/16 (2006.01)

(52) U.S. Cl. ...................... 709/203; 709/246

(58) Field of Classification Search ................. 709/221, 709/228, 245, 203, 246; 707/203
See application file for complete search history.

(56) References Cited

U.S. PATENT DOCUMENTS

| | | | |
|---|---|---|---|
| 4,754,428 A | 6/1988 | Schultz et al. | |
| 4,811,207 A | 3/1989 | Hikita et al. | |
| 5,202,982 A | 4/1993 | Gramlich et al. | 395/600 |
| 5,210,824 A | 5/1993 | Putz et al. | |
| 5,212,787 A | 5/1993 | Baker et al. | |
| 5,226,161 A | 7/1993 | Khoyi et al. | |
| 5,257,369 A | 10/1993 | Skeen et al. | |
| 5,331,673 A | 7/1994 | Elko et al. | |
| 5,339,392 A | 8/1994 | Risberg et al. | |
| 5,421,015 A | 5/1995 | Khoyi et al. | |
| 5,473,772 A | 12/1995 | Halliwell et al. | 395/650 |
| 5,483,468 A | 1/1996 | Chen et al. | |
| 5,504,879 A | 4/1996 | Eisenberg et al. | 395/600 |
| 5,572,643 A | 11/1996 | Judson | |
| 5,684,955 A | 11/1997 | Meyer et al. | |
| 5,704,017 A | 12/1997 | Heckerman et al. | |
| 5,727,129 A | 3/1998 | Barrett et al. | |
| 5,732,218 A | 3/1998 | Bland et al. | |
| 5,740,430 A | 4/1998 | Rosenberg et al. | 395/616 |

(Continued)

OTHER PUBLICATIONS

Dasgupta, Partha, "Resource Location in Very Large Networks," IEEE, pp. 156-163, May 1994.

(Continued)

Primary Examiner—Andrew Caldwell
Assistant Examiner—Stephan Willett
(74) Attorney, Agent, or Firm—Sprinkle IP Law Group

(57) ABSTRACT

A method and system are disclosed for cache management and regeneration of dynamically-generated locale-sensitive content (DGLSC) in one or more server computers within a client-server computer network. One embodiment of the method of this invention can comprise receiving a request for content from a user at a client computer and determining the user's locale preference with, for example, an automatic locale detection algorithm. The requested content can be dynamically generated from a template as DGLSC based on the user locale preference. If the template is a cacheable template, a locale-sensitive filename can be generated for the DGLSC based on the user locale preference. The locale-sensitive filename can be associated with the DGLSC. The DGLSC can be cached in a locale-sensitive directory, such that it can be served (and thus avoid duplicative generation of the same content) in response to subsequent requests from users having the same locale preference The DGLSC is then served to the requesting user at his or her client computer.

19 Claims, 2 Drawing Sheets

U.S. PATENT DOCUMENTS

| | | | |
|---|---|---|---|
| 5,761,416 A | 6/1998 | Mandal et al. | |
| 5,774,660 A | 6/1998 | Brendel et al. | |
| 5,790,426 A | 8/1998 | Robinson | |
| 5,790,790 A | 8/1998 | Smith et al. | |
| 5,796,952 A | 8/1998 | Davis et al. | |
| 5,870,559 A | 2/1999 | Leshem et al. | |
| 5,878,223 A | 3/1999 | Becker et al. | |
| 5,884,282 A | 3/1999 | Robinson | |
| 5,918,014 A | 6/1999 | Robinson | |
| 5,958,008 A | 9/1999 | Pogrebisky et al. | |
| 6,012,052 A | 1/2000 | Altschuler et al. | |
| 6,014,638 A * | 1/2000 | Burge et al. | 705/27 |
| 6,041,311 A | 3/2000 | Chislenko et al. | |
| 6,049,777 A | 4/2000 | Sheena et al. | |
| 6,067,565 A | 5/2000 | Horvitz | |
| 6,085,196 A | 7/2000 | Motoyama et al. | |
| 6,085,226 A | 7/2000 | Horvitz | |
| 6,092,049 A | 7/2000 | Chislenko et al. | |
| 6,094,662 A | 7/2000 | Hawes | |
| 6,112,279 A | 8/2000 | Wang | |
| 6,122,661 A * | 9/2000 | Stedman et al. | 709/217 |
| 6,128,655 A * | 10/2000 | Fields et al. | 709/219 |
| 6,128,665 A | 10/2000 | Iturralde | |
| 6,138,141 A | 10/2000 | DeSimone et al. | |
| 6,141,737 A | 10/2000 | Krantz et al. | |
| 6,151,624 A | 11/2000 | Teare et al. | |
| 6,185,586 B1 | 2/2001 | Judson | |
| 6,185,608 B1 | 2/2001 | Hon et al. | |
| 6,192,415 B1 | 2/2001 | Haverstock et al. | |
| 6,198,824 B1 | 3/2001 | Shambroom | |
| 6,205,492 B1 | 3/2001 | Shaw et al. | |
| 6,272,492 B1 | 8/2001 | Kay | |
| 6,311,180 B1 * | 10/2001 | Fogarty | 707/4 |
| 6,389,427 B1 | 5/2002 | Faulkner | |
| 6,408,360 B1 | 6/2002 | Chamberlain et al. | |
| 6,549,916 B1 | 4/2003 | Sedlar | |
| 6,571,246 B1 | 5/2003 | Anderson et al. | |
| 6,601,233 B1 | 7/2003 | Underwood | |
| 6,651,095 B2 * | 11/2003 | Barlock et al. | 709/223 |
| 6,651,217 B1 | 11/2003 | Kennedy et al. | |
| 6,665,842 B2 * | 12/2003 | Nielsen | 715/542 |
| 6,697,844 B1 | 2/2004 | Chan et al. | |
| 6,701,428 B1 | 3/2004 | Harvey, III et al. | |
| 6,774,452 B1 * | 8/2004 | Ramkumar et al. | 257/506 |
| 6,826,592 B1 * | 11/2004 | Philyaw et al. | 709/202 |
| 6,850,941 B1 | 2/2005 | White et al. | |
| 6,884,282 B2 | 4/2005 | Stevens et al. | |
| 6,910,066 B1 * | 6/2005 | Pohl | 709/203 |
| 2001/0032254 A1 | 10/2001 | Hawkins | |
| 2001/0034771 A1 | 10/2001 | Hutsch et al. | |
| 2001/0054087 A1 * | 12/2001 | Flom et al. | 709/218 |
| 2002/0065912 A1 | 5/2002 | Catchpole et al. | |
| 2002/0165877 A1 | 11/2002 | Malcolm et al. | |
| 2002/0178187 A1 | 11/2002 | Rasmussen et al. | |
| 2003/0140316 A1 | 7/2003 | Lakritz | |
| 2003/0217117 A1 | 11/2003 | Dan et al. | |
| 2004/0030697 A1 | 2/2004 | Cochran et al. | |
| 2004/0205452 A1 | 10/2004 | Fitzsimmons et al. | |

OTHER PUBLICATIONS

Vetter, Ronald, J., "Mosaic and the World-Wide Web," IEEE, pp. 49-57, Oct. 1994.

Obraczka et al., "Internet Resource Discovery Services," IEEE, pp. 8-22, Sep. 1993.

Sharma et al., "Hypertext Based Distributed Object Management for Information Location and Retrieval," IEEE, pp. 102-107, 1993.

wysiwyg://101/http://msdn.microsof....brary/wcedoc/wcesecur/crypto_1.htm, pp. 1-2, 2001.

Turley, "Design Specification for Packaged Application Support in Assassin,"pp. 2-6, 1999.

Turley, Functional Specification for Packaged Application Support in Assassin, pp. 2-6, 1999.

H. Schrimpf, "Migration of Processes, Files, and Virtual Devices in the MDX Operating System". Operating Systems Review. vol. 29, pp. 70-81, Apr. 1995.

"DataSage Customer Analyst: Customer Intelligence from you POS Data", Data Sage, Discount Store News, 11 pages, Apr. 6, 1998.

Turley, "Design Specification for Packaged Application Support in Assassin" pp. 2-6, 1999.

Turley, "Functional Specification for Packaged Application Support in Assassin,"pp. 2-6, 1999.

Vetter, Ronald, "Mosaic and the World-Wide Web", Source, IEEE Computer, pp. 49-57, Oct. 1994.

Encryption and Decryption, (formerly available online at wysiwyg://101/http://msdn.microsof....brary/wcedoc/wcesecur/crypto_1.htm), Microsoft Corporation, pp. 1-2, May 23, 2001.

Kitts, "An Evaluation of Customer Retention and Revenue Forecasting in the Retail Sector: Investigation into the effects of Seasonalilty, Spending an Method" by DataSage, Inc., 63 pages, Oct. 25, 1999.

Kitts, "RMS Revenue and Retention Forecasting Final Phase Model Specification" by DataSage, Inc., Jan. 31, 2000, 16 pages.

Discount Store News, "Datasage Customer Analyst," 1998.

Montgomery, et al., "Estimating Price Elasticities with Theory-Based Priors," J. Marketing Research, vol. 36, pp. 413-423, Nov. 1999.

Simon, "Price Management," Elsevier Sci Pub, pp. 13-41, 1989.

Subrahmanyan and Shoemaker, "Developing Optimal Pricing and Inventory Policies for Retailers Who Face Uncertain Demand," J. Retailing, vol. 72, pp. 7-30, 1996.

Vilcassim and Chintagunta, "Investigating Retailer Product Category Pricing from Household Scanner Panel Data," J. Retailing, vol. 71, pp. 103-128, 1995.

Weinstein, "Tackling Technology," Progressive Grocer, 6 pages, 1999.

Wellman, "Down in the (Data) Mines," Supermarket Business, pp. 33-35, 1999.

RT News, "New Customer Management System Returns Lost Sales to Dick's," RT Magazine, 1 page, 1999.

DataSage, Inc., "DataSage Customer Analyst," Progressive Grocer, 2 pages, 1998.

Miller, M., "Applications Integration-Getting It Together," PC Magazine, pp. 111-112, 116-120, 136, 138, Feb. 8, 1994.

"PointCast 2.0 Eases Burden on Network", PC Week, 2 pages, Jun. 2, 1997.

Strom, David, "The Best of Push", 6 pages, Apr. 1997.

"When Shove Comes to Push", obtained from http://web5.infotrac.galegroup.com/itw/info.../purl-rcl_eaim_0_a19113966&dyn=6!ar_fml?sw_aep+ucsantacru 5 pages, Feb. 10, 1997.

thirdvoice.com—Home Page and Frequently Asked Questions (7 pages), www.thirdvoice.com/help.20/faq.htm, 2000.

* cited by examiner

METHOD AND SYSTEM FOR CACHE MANAGEMENT OF LOCALE-SENSITIVE CONTENT

RELATED INFORMATION

This application claims priority under 35 U.S.C. §119(e) to U.S. Provisional Patent Application No. 60/257,387, filed Dec. 21, 2000, entitled "An Automatic Locale Detection System and Method," which is hereby fully incorporated by reference.

TECHNICAL FIELD OF THE INVENTION

This invention relates generally to the operation of client-server computer networks. More particularly, the present invention relates to methods and systems for caching and delivering locale-sensitive content over a client-server computer network. Even more particularly, the present invention relates to a method and system for the regeneration and file management of locale-sensitive content.

BACKGROUND OF THE INVENTION

The Internet, and in particular the World-Wide Web ("WWW"), are a large collection of computers operated under a client-server computer network model. In a client-server computer network, a client computer requests information from a server computer. In response to the request, the server computer provides the requested information to the client computer. Client computers are typically operated by individuals. Server computers are typically operated by large information providers, such as commercial organizations, government entities and universities.

To ensure the interoperability of the potentially different computers and computer operating systems in a client-server computer network, various protocols are observed. For example, the Hypertext Transport Protocol ("HTTP") is used for transporting hypertext files over the Internet. In addition, the WWW observes a number of protocols for organizing and presenting information, such as the Hypertext Markup Language ("HTML") protocol and the Extended Markup Language ("XML") protocol.

The HTTP protocol, in particular, supports a feature known as "dynamically-generated customized pages." A dynamically generated customized page comprises a set of information in a particular format. The same set of information can be presented in various ways, depending upon whether a particular format is desired, and supported, by the requesting client computer. For example, a first client computer may support the ability to present information in columns, while a second client computer may instead support the ability to present information in the form of a table. As a further example, the first client computer may be operated by a user in a Spanish speaking locale, while the second computer is operated by a user in an English speaking locale. A server computer receiving an information request from the first client computer may respond with a dynamically generated page presenting the requested information in a column format and in the Spanish language, while responding to a request from the second client computer with a dynamically generated customized page that presents the requested information in English and in the form of a table. Thus, two different customized pages can be created to represent the same information.

Computer executable instructions are used to dynamically generate customized pages. U.S. Pat. No. 5,740,430, entitled "Method and Apparatus for Server-Independent Caching of Dynamically-Generated Customized Pages," issued on Apr. 14, 1998, to Rosenberg, et al. (the "Caching Application"), discloses a method and apparatus to efficiently respond to a large number of requests for customized pages. In particular, the Caching Application discloses a method and apparatus for operating a client-server computer network such that a server computer dynamically generates and then stores customized pages requested from a client computer. Subsequent requests for previously generated customized pages are retrieved from a cache in the server computer. Since previously generated customized pages need not be regenerated, computational overhead is reduced. The Caching Application is hereby incorporated by reference in its entirety.

Further, U.S. patent application Ser. No. 09/965,914, entitled "Method and System for Cache Management of Dynamically-Generated Content," filed on Sep. 28, 2001 (the "Cache Management Application"), discloses a method and system for regeneration and file management of previously cached dynamically-generated content, such as that disclosed in the Caching Application. The Cache Management Application discloses a method and system for efficiently managing the caching and delivery of dynamically-generated content over a computer network. The Cache Management Application is also hereby incorporated by reference in its entirety.

The Internet standards that govern web interactions, both at the semantic level, such as HTML (a content language) and HTTP (a transfer protocol), are derived from an ASCII (American Standard Code for Information Interchange)-based environment. When using only ASCII, language is primarily restricted to English or ASCII derivatives of western European languages. Therefore, most meta information associated with content that comes across a network in HTTP is intended to be ASCII. Meta information is typically encoded information transmitted along with the main data in a data transfer to provide additional information associated with the main data, such as creation date, authorship, formatting, locale information, language, etc. However, with the proliferation of Internet use, Internet content providers are faced with the need to support, among others, multi-lingual website visitors. The problem exists, however, that there is no clear way for a multi-lingual website visitor to announce to a content provider his or her language preference. In fact, the problem goes beyond determining a users language preference and is a problem of determining a user's locale preferences. A user's locale can perhaps indicate not only a user's language preference, but also other locale specific information, such as the user's time zone, which can be used to indicate relative time differences between the user and the content provider. For example, a time indicator could indicate whether the user's locale supports Daylight Savings Time, which can be important in doing time calculations for timing of events.

Further, it is important to content providers to be able to provide content to a website user in a format that is useful and familiar to the user. For example, the date/time format, currency format, monetary symbols, the use of dashes, commas and periods, etc., can vary greatly from locale to locale. Even within a locale, language and format variances can occur. For example, Spanish has two sorting orders and Chinese has five. To properly present data to a variety of multi-lingual users, content providers need to be able to determine the user's locale in order to serve locale-appropriate content and related meta information. Related U.S. patent application Ser. No. 09/931,228, entitled "Method and System for Determining a Network User's Locale," filed on Aug. 16, 2001 (the "Locale Detection Application"), discloses one such method and system for automatically determining a network user's locale to provide locale-appropriate content to a user. The Locale Detection Application is hereby incorporated by reference in its entirety.

However, even with methods and systems for determining a network user's locale, such as that disclosed in the Locale Detection Application, problems still exist with regards to managing the caching of content that can then be delivered in a locale-specific manner. This problem is of particular importance with regard to dynamically-generated content. Dynamically-generated content comprises content that is relatively "on demand," because it can change with a relatively high frequency. Unlike static content (e.g., an image such as a .gif file or a .jpg file), dynamically-generated content may not be fully assembled and ready to be delivered until requested by a user. For example, the front page of a news site for the Chicago Tribune or other major newspaper can comprise dynamically-generated content because the headlines, the weather, or some other changing aspect of the displayed content may be subject to frequent change. Thus, the content presented to a user may not be constructed until the time of the user's request.

Dynamically-generated content can be, in some instances, cached. This means that previously generated versions of the content can be stored in, for example, a database, for future access by a user. Thus, by caching dynamically-generated content, content delivery latencies, as well as excessive use of computational resources can be avoided. This is because the same version of the dynamically-generated content may be generated once and then stored for subsequent access by multiple users. By not having to generate the same content for each user request for that content, the demand on a content provider's back-end server systems and databases can be substantially reduced. As a result, latencies between requesting of the content by a user and the delivery of the content to the user are similarly reduced.

Such latencies can occur because generating dynamically-generated content takes time. Often the various components comprising the requested content must be obtained from a database (or various databases) and then interpreted before being arranged together and delivered to a user. Although gathering and arranging the requested content may typically only take on the order of several hundred milliseconds, on a heavily-visited website, the cumulative demand of millions of users requesting the same content (and the content having to be generated individually for each user), can result in a very slow delivery of a content provider's home page (or any other page). In certain cases, such as for a newspaper website or other commercial media site, such delays can result in the death of the site because users will not want to wait long for content to be delivered in today's "must-have-it-now" environment. Further, the computational resources required to generate and deliver the same content for each user request can place a tremendous strain on the content provider's back-end server systems. Servers can thus be overworked and are much more likely to fail.

It is therefore typically preferable to cache dynamically-generated content whenever possible (i.e., until the content has undergone a change, at which point it can be regenerated and the new version, perhaps, cached). Load spikes and overburdening of server computers due to the regeneration of the same content each time it is requested by a user can be reduced or avoided. Adverse effects on a content provider's server(s) and on the network as a whole can generally be reduced or avoided. A content provider's back-end processes and their associated databases can thus be free to perform other tasks or otherwise enjoy the benefits of a decreased computational load.

The same advantages that caching provides for dynamically-generated content in general can be further taken advantage of with respect to locale-sensitive content. In today's increasingly global climate, and particularly on a global computer network such as the Internet, content providers have an increased need to support multi-lingual websites. Consider, for example, a newspaper content provider's website. Different language versions of an online newspaper can be provided to users, depending on the user's locale. For example, in the Pacific Rim there exist many newspaper websites that provide an English language version of their content and also a second version in another (perhaps local) language. At least two languages are typically supported, and maybe more. Content providers of this type can face the problem of having to cache different versions of the same content, based on language. For example, if a dynamically-generated page is cached (e.g., in accordance with the teachings of the Cache Management Application), the locale of the user may be automatically detected (e.g., in accordance with the teachings of the Locale Detection Application) and a page dynamically generated such that the page contents are locale sensitive. The template generating such a page may be marked as cacheable (i.e., the generated content will be cached); however, the dynamically-generated page, if cached in accordance with the language of the current requestor, may not be an appropriately locale-based version for a subsequent visitor. Thus, for example, if a first visitor to a website requests content in Chinese and the content is subsequently cached as a Chinese version, a subsequent English visitor to the website would be served that same Chinese page (if cached content were being served). Therefore, to provide locale-sensitive content that can be cached for delivery to subsequent visitors in a locale appropriate version, the content must be saved in such a way that it can be recalled in different versions for visitors from different locales.

Further, it is typically preferable to not cache highly volatile pages. Highly volatile dynamic pages are pages that are likely to change often and thus are preferably maintained as dynamic non-cached pages. Currently existing caching methods and systems perform what is called "cache-on-demand." Cache-on-demand means that when a user requests certain dynamically-generated content, if that content (dynamically-generated page) is marked as cacheable, the system and method will cache the content after it is generated and prior to serving the content to the user. However, it may be desirable to identify highly-accessed dynamically-generated pages for pre-caching. Pre-caching means that the content is cached before it is requested by a user and maintained in a cache until it undergoes a change. The content can, after a change, be cached again as a new version. However, the same problems can arise with pre-caching as for cache-on-demand with respect to providing locale-sensitive content. In other words, to serve a user a locale-appropriate version of previously cached content, each cached locale-sensitive version of the content must in some way be associated with its respective locale and stored in a locale-sensitive manner such that the appropriate version of the content can be served from a cache to a requesting user.

With regard to pre-caching and to cache-on-demand, the situation may also arise where cached content requires updating prior to a user requesting the content. A content provider implementing a system and method for caching dynamically-generated content may wish to automatically regenerate and re-cache such content prior to a user requesting the out-dated version of the content. The capability to automatically regenerate cached content on a locale-sensitive basis also requires a locale identifier of some sort to be associated with each locale-specific version of the cached content.

Thus, for performance reasons, it may be necessary for a content provider to cache relatively static content available at its website. It would be most efficient to cache such content by locale. For example, many multi-lingual websites store multi-lingual content in content databases as Unicode data employing Unicode-compatible byte encodings (e.g., Universal Character Set Transformation Formation, 8-bit (UTF-8), Universal Character Set, 2-byte (UCS-2), etc.). Depending on the nature of the content, the encoding translation process from Unicode to a website visitor's encoding preferences (which can be set at the user's web browser) can be very computer resource intensive. With locale-sensitive caching, the computing cost of encoding translation occurs only when a dynamic page is first requested (i.e., the first time the content is generated). All subsequent requests for the same content by visitors with the same locale preferences will receive the cached locale-specific content, so long as the content is cataloged correctly by locale.

Based on proper user locale detection, a cached page's (cached contents) file specification (filing system identification) can have embedded locale information (e.g., language, territory, encoding, sort order, etc.) that associated the cached content with a specific locale. The server process selecting content for delivery to a user can retrieve the locale-specific cached content based on the detected locale of the user.

Successful multi-lingual websites thus must not only provide multi-lingual content and locale-sensitive navigation, but they must also support multiple simultaneous access to the website by clients operating in different locales. In short, correct transient locale synthesis is a first step in representing the requirements of each website visitor and in preparing a content provider's website experience in a culturally customized fashion. Each user (visitor to a website) may have different locale preferences which he or she would like to govern their web content consumption and navigation. A user's preferences may include language, data encoding, and monetary, numeric and/or time zone representations. A user's locale preferences can be either explicitly specified in a user profile, which can be acquired through, for example, a registration process, or implicitly embedded in content requests sent from users' agents (e.g., web browsers) to content servers (e.g., web servers). User locale preferences provide useful information to a content delivery system to properly format cultural or language-sensitive information, such as dates, times, and monetary and numeric information. Any caching system for such locale-sensitive content must be able to provide the same. These locale-sensitive preferences can be obtained by a method such as that disclosed in the Locale Detection Application.

SUMMARY OF THE INVENTION

Therefore, there is a need for a method and system for cache management of dynamically generated locale-sensitive content that can provide locale-sensitive content to a website user in a transparent manner. Such a method and system should enable content providers to cache and deliver locale-specific content to a visitor in a computationally efficient manner.

Still further, a need exists for a method and system for cache management of dynamically-generated locale-sensitive content that can generate and cache multiple locale-sensitive versions of the same content such that locale appropriate versions can be delivered to users having different locale preferences.

Further still, a need exists for a method and system for cache management of dynamically-generated locale-sensitive content that can associate a locale-sensitive attribute with different versions of the same content so that the correct version of the content can be delivered to a user from a corresponding locale.

Even further, a need exists for a method and system for cache management of dynamically-generated locale-sensitive content that can create locale-sensitive file associations with different versions of the same content such that automatic regeneration of the content can be performed without the user having to first request the content (and hence without having to detect the user's locale from his or her request). Because a locale-sensitive association is maintained with the filename of each version of the content, the content can be regenerated with the correct locale preferences without the need for a user request.

In accordance with the present invention, a method and system for cache management of dynamically-generated locale-sensitive content are provided that substantially eliminate or reduce the disadvantages and problems associated with prior art methods and systems for caching of dynamically-generated content, including the problems of reduced network performance, and the inability of prior art methods to deliver locale-specific content to users from various locales.

More specifically, the present invention provides a method and system for cache management and regeneration of dynamically-generated locale-sensitive content (DGLSC) in one or more server computers within a client-server computer network. One embodiment of the method of this invention can comprise receiving a request for content from a user at a client computer and determining the user's locale preference with, for example, an automatic locale detection algorithm. The requested content can be dynamically generated from a template as DGLSC based on the user locale preference. If the template is a cacheable template, a locale-sensitive filename can be generated for the DGLSC based on the user locale preference. The locale-sensitive filename can be associated with the DGLSC. The DGLSC can be cached in a locale-sensitive directory, such that it can be served (and thus avoid duplicative generation of the same content) in response to subsequent requests from users having the same locale preference The DGLSC is then served to the requesting user at his or her client computer.

A technical advantage of the embodiments of the method and system for cache management of dynamically generated locale-sensitive content of the present invention is that they provide locale-sensitive content to a website user in a transparent manner. Such a method and system enables content providers to cache and deliver locale-specific content to a visitor in a computationally efficient manner.

Another technical advantage of the embodiments of the present invention is that they provide the ability to generate and cache multiple locale-sensitive versions of the same content such that locale appropriate versions can be delivered to users having different locale preferences.

Still another technical advantage of the embodiments of this invention is the ability to associate a locale-sensitive attribute with different versions of the same content so that the correct version of the content can be delivered to a user from a corresponding locale.

Still another technical advantage of the embodiments of this invention is the ability to create locale-sensitive file associations with different versions of the same content such that automatic regeneration of the content can be performed without the user having to first request the content (and hence without having to detect the user's locale from his or her request). Because a locale-sensitive association is maintained with the filename of each version of the content, the content can be regenerated with the correct locale preferences without the need for a user request.

The embodiments of the method and system of this invention can each comprise a plurality of computer-executable instructions stored on a computer-readable medium. The embodiments of the method of this invention can further comprise an algorithm comprising a plurality of computer-executable software instructions stored on a computer-readable medium.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Figure 1:
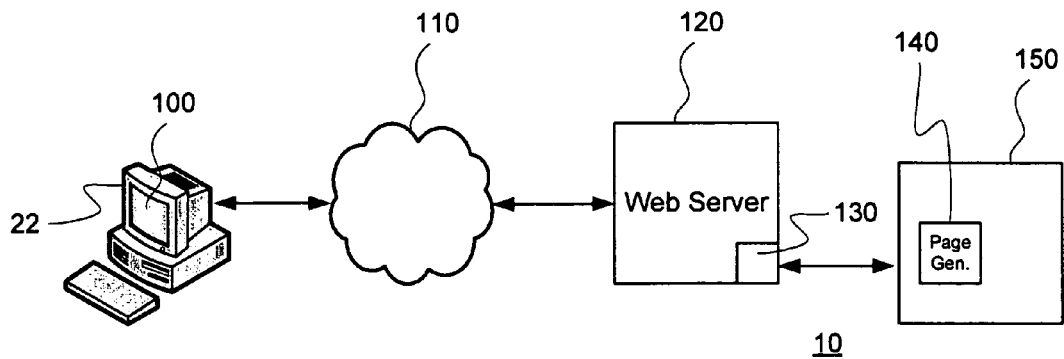
FIG. 1 is a simplified block diagram showing the interrelationships of one embodiment of the method and system for cache management of dynamically-generated locale-sensitive content of this invention.

Preferred embodiments of the present invention are illustrated in the FIGUREs, like numerals being used to refer to like and corresponding parts of the various drawings.

Together with, for example, the inventions disclosed in the Caching Application, the Cache Management Application, and the Locale Detection Application, the embodiments of the method and system of this invention can provide the capability to, in a client-server computer network (such as the Internet), transparently generate, cache, and distribute multiple locale-sensitive versions of the same dynamically-generated content such that appropriate versions of the content can be delivered to users in corresponding locales. In particular, the embodiments of the present invention provide the ability to generate a new version of, for example, a customized page, following a regeneration event (e.g., the content changes) to automatically replace the superseded version of the customized page without a significant decrease in the level of network performance. Further, the embodiments of the method and system of this invention can be used to cache and manage such content, such as to enable content providers to deliver locale-specific content on demand to visitors at different locales.

Embodiments of the method and system of this invention can use a specific form of a filename associated with each version of dynamically-generated and cached content to identify and associate each version with the locale whose preferences it embodies. For example, in a cache-on-demand situation, a request for content (e.g., a dynamically-generated page) is received from a user across a network. A content provider's servers can automatically detect the user's locale, search for the requested content on its databases, and, if necessary, dynamically generate the requested content. If the template from which the requested content is generated is marked as cacheable, the embodiments of the method and system of this invention can cache the generated content using a locale-specific filename. In this way, different language versions of the same content can be differentiated from each other. Subsequent users requesting the same content, upon detection of their requesting locale, can then be served the locale-appropriate version of the content based on their detected locale and using the locale-specific filename associated with that locale's version of the content. A client-server network of a content provider implementing an embodiment of the method and system of this invention can thus provide locale-specific content in an appropriate manner to users from different locales without having to regenerate the same content each time it is requested by a user.

An advantage of the embodiments of the method and system of this invention is thus the ability to separate the filename space such that locale-specific versions of the same content can be cached and subsequently retrieved and delivered to users associated with the same locale. Different language versions, for example, can thus be saved in different directories. For example, an English language directory and a Japanese language directory can be configured, as well as directories for other locale-sensitive attributes. One embodiment of the method of this invention could thus comprise the steps of automatically detecting a user's locale using, for example, the invention disclosed in the Locale Detection Application, and then dynamically generating the requested content. Once the content has been dynamically generated, this embodiment of the method of the present invention can determine if the page template from which the content is generated is marked for caching. If so, the dynamically-generated content can be saved into a locale-specific cache directory with a filename that is associated with and identifies the requesting locale (e.g., U.S., Japan, China). Upon a request for the same content by a user from the same locale, the content need not be regenerated, but can instead be served from the locale-specific directory to the user after determining the user's locale.

Further, embodiments of the present invention can detect if previously cached dynamically-generated content should be updated (e.g., it has been changed). For example, cached content might be stored in a database at one server, but some components that make up the cached content might be stored on a different database. The content on the second database could be changed by, for example, a scriptor, thus making obsolete the currently cached content on the first server. Embodiments of this invention can be used to automatically regenerate cached content pages in which components have been changed, even without a user first requesting the content. However, to properly automatically regenerate the changed content, a client-server network must know the locale of the original request that resulted in generation of the content. This is because, in such a case, a user has not connected to a content provider's site to request the content and hence the user's locale cannot be concurrently automatically determined. The embodiments of this invention, however, can associate cached content with a locale by using a predefined filename that can incorporate locale-specific attributes which the content caching and generation aspects of the embodiments of this invention can use to identify, regenerate and serve data in a locale-specific manner.

The embodiments of the method and system of this invention, in combination with automatic locale detection, can generate a filename to associate a dynamically-generated content that is subsequently cached with the locale of the user requesting the content. The filename can be more than just a language indication, as it can include attributes designating language, territory, type of encoding, type of sorting, locale origin, etc. For example, the filename might indicate sort order and whether or not the territory or encoding was defaulted. The filename specification of the embodiments of this invention can thus comprise various metadata arranged in an encoded format. The encoded format can be set so as to satisfy potential filename length limitations. The filename used by the embodiments of this invention can thus be compressed down into a special format to code the filename. The filename can comprise metadata to represent a detected locale that can subsequently be used to regenerate cached locale-specific content based on the cached content locale.

The embodiments of the method and system of this invention can automatically detect a user's locale in a manner in accordance with the invention disclosed in the Locale Detection Application. Alternatively, a user can explicitly indicate his or her locale or the user's locale can be a default value. Once the user's locale-specific information is determined, the requested content can be generated and/or cached using the filename associated with the locale by means of said metadata. Subsequent requests for the same locale-specific content can be responded to based on the associated locale-specific filename generated as part of an initial request for that content. The information associated with the detected locale determined in the locale detection process of the embodiments of this invention can serve as the foundation for the locale-sensitive caching schema described herein. A substring, for example, named "locale-cachefilenamecomponent" can be embedded in each cached filename within a directory structure such as a root directory (e.g., a docroot system). This substring can be encoded with the various information related to the response locale (i.e., the requesting locale): language, territory, encoding, sorting, locale origin, whether or not the territory is defaulted, whether or not the encoding is defaulted. The format for a file string can be, for example, "+\\-ttx_axbc," where "\\" is a two-letter ISO-639 code for language (e.g., en=English, es=Spanish);

tt is a two-letter ISO-3166 code for territory (e.g., US=United States, MX=Mexico);

a is a one-character code for encoding (e.g., 1=ISO-8859-1, f=UTF-8);

b is a one-letter code for sorting (e.g., b=binary, s=Spanish);

c is a one-letter code for locale origin (e.g., a=client, b=cookie, c=default); and x can be "d" or "s"; If x=d, the field (territory or encoding) is defaulted; otherwise, the field is specified.

For example, a locale preference file string "en_US.ISO-8859-1@binary" received from a client (user) can be encoded as "+en-USS_1SBA" if both territory and encoding are specified in the client's locale setting. All of the locale-specific information can be used in a cached page regeneration by a cache manager daemon ("CMD") that can be used by embodiments of this invention to manage the regeneration and serving of cached content. The locale-specific information can also be used when deciding whether or not to return a cached page to a request (i.e., if the requesting user's locale information matches exactly the locale information embedded in the cached filename, the cached file can be used to service the request).

Once a visitor's locale preferences are determined, the locale identifying information can be used to efficiently retrieve locale-specific cached content from a server file system or to create a new version of the cached content (or a totally new cached file) in the event the content needs to be dynamically generated (or regenerated). Using HTTP header extensions, a user's locale preferences can be passed to appropriate page generation engines (such as those disclosed in the Caching Application and the Cache Management Application) to focus page generation processing. Inside a page generation engine scripting environment (e.g., TCL (Token Control Language), ASP (Active Server Pages), JSP (Java Server Pages)), a visitor's locale information can be represented as a locale object or a context object in which locale-specific scripting activities can occur. For example, locale-specific numeric and monetary formatting, date calculations, and possibly even native-byte page content encoding translation can be performed.

Embodiments of the method and system of this invention can comprise computer-executable software instructions operable to be executed either on the web server side processing space (e.g., agent configuration space) or on the back-end server side process of the dynamically-generated locale-sensitive content cache management system and method of this invention. The embodiments of this invention can each comprise an algorithm comprising computer-executable software instructions stored on a computer-readable medium. The computer-readable medium can comprise memory, such as RAM or ROM, or other storage medium, such as a hard drive, tape drive, or any such other storage medium or device. The software instructions comprising the algorithm can be executed in a local or remote server and can further comprise software applets located at the web server or other location on a content provider's computer system.

The embodiments of the method and system of this invention can be used with a content caching and/or content generation method and system, such as those disclosed in the Caching Application and the Cache Management Application. Further, this invention can be used with a locale detection method and system such as that disclosed in the Locale Detection Application. Such use is contemplated to be within the scope of the embodiments of this invention. The embodiments of the method and system of this invention can thus provide for capturing a user's locale information to ensure the correctness of cached content retrieval, as well as cached content regeneration, in the event of a template change or other type of event that can result in flushing of cached content.

The meta information obtained through an automatic locale detection process can be passed along to a scriptor once the locale detection portion is complete and the process drops into a scripting environment. In this sense, when automatically determining locale, the embodiments of this invention simply determine a user's locale and do not necessarily assign the locale to the content that will be served to the user. The detected locale can thus be passed along to a scriptor in a scripting environment and the scriptor can decide, via the passed-along meta information, whether or not a detected locale will be accepted and assigned to the generated and served content. This situation can occur, for example, when a content provider wishes to control content delivery to certain locales based on the content provider's preferences, as opposed to the automatically detected locale preferences. For example, if locale the territory is defaulted to in an automatic locale detection process, it may not be clear whether, for example, a user is from the United States or from another English-speaking country, such as Australia. A content provider may decide that since his is an Australian website, the territory associated with his or served content should be Australia. A scriptor can then decide that the content served back to a user should be in Australian format, such as Australian dollars, time zones, etc. The scriptor can accomplish a locale preference shift by overriding the assigned locale from the automatic locale detector in the scripting environment (e.g., in this case, changing the territory to Australia).

The embodiments of the method and system of this invention can be implemented in any scripting environment (e.g., Toolkit Control Language (TCL), Java Server Pages (JSP) or Active Server Pages (ASP)). The embodiments of the method and system of this invention can be implemented within the page generation process of a content server and automatic locale detection can occur before dropping into a scripting environment. In another embodiment of the method and system of this invention, portions of the content manager (e.g., automatic locale detection) can be located on a web server plug-in, as opposed to the page generator portion of a server. This moves a portion of the process upstream from the content server, such that when a user makes contact through a web browser to a content provider's web server, the plug-in comprising the automatic locale detection method of this invention can be an interface between the web server and the page generator that will serve content to the user.

The web server plug-in embodiment of the method and system of this invention can allow support for the aforementioned scripting environments. The automatic locale detection portion of the embodiments of this invention can thus be scripting environment independent. Further, this embodiment can thus provide for locale-sensitive caching to also be scripting environment independent. By moving the locale detection aspect of the embodiments of this invention upstream from the page generation aspect of a content provider's server system, it is possible to regenerate locale-sensitive cached content because the associated content locale information is obtained first. Form field detection, however, is exclusive to a Toolkit Control Language (TCL) environment page generator and cannot be moved upstream into a web server.

The embodiments of the method and system of this invention can comprise a discrete set of computer-executable software instructions that can be used as a plug-in to various page generation/page serving systems. Further, information provided by the embodiments of this invention can be overwritten in the scripting environment with preferences set by the content provider implementing an embodiment of this invention. The content provider can thus have the flexibility to overwrite any of the detected locale-specific data. For example, in the scripting environment, a content provider could decide that if a particular cookie is detected, he or she will provide certain content in a different manner, or if a particular language is detected, content will default to a particular territory.

FIG. 1 is a simplified block diagram showing the inter-relationships of one embodiment of the method and system for cache management of dynamically-generated locale-sensitive content of this invention. In the embodiment of FIG. 1, a web server plug-in 130 can provide the automatic locale detection aspect of the embodiments of this invention. Client-server network 10 includes web browser 100 on client computer 22. Web browser 100 can be a user's interface to a content provider's website. Web browser 100 is used to access, over a network 110, which can be the Internet, a web server 120 maintained by the content provider. Plug-in 130, which can comprise a set of computer-executable software instructions can perform the locale detection functions discussed herein. Plug-in 130 is associated with and interfaces with page generator program on server 150. Page generator program 150 can be a TCL page generator, an ASP page generator, a JSP page generator, or other such encoding page generator as known to those in the art. Plug-in 130 is located on server 120, which can be remote from server 150. Page generator 140 is used to dynamically generate content requested by a user.

Embodiments of the method and system of the present invention can generate as an output from the automatic locale detection process a locale object that contains pertinent demographic information relating to a user's locale. In a scripting environment, such as the TCL scripting environment, the ASP environment, or the JSP environment, it is desirable to have a locale object, as opposed to a locale argument, that can govern certain operations. For example, when a user visits a website that provides dynamic web page generation, the dynamic web page generation requires data from a database and objects and formatting to generate and present the requested content to a user. This dynamic web page generation takes place in a scripting environment, which can perform functions such as formatting strings, formatting currencies, performing date calculations, etc., that are locale sensitive. Often, a locale object is used to format currency, numbers, dates, and date/time calculations. It is desirable to have a locale object that will govern these operations so that when this type of format is required, a command, such as a "format" command, can be used and one of the arguments to the command is the locale object. The other arguments can be, for example, the month, day and year. The command will then return a value for the date, month, and year in the proper locale-specific string for that data.

At the end of an automatic locale detection process, a locale object can thus be created that can have an arbitrary name that is easily identified. For example, a request_locale object can be created. This end product of the automatic locale detection process can be an immutable object. Further, in the scripting environment, transient locale objects can also be created to provide transcoding of a detected locale to an alternate desired locale formatting. Together, the immutable request_locale object and the transient locale object can be used to provide transcoding of content in a manner desired by the content provider that does not necessarily correlate to a detected locale. For example, a transient locale object can be named the "response_locale" to indicate that it can be used to transcode content to a desired response format for a particular user.

Figure 2:
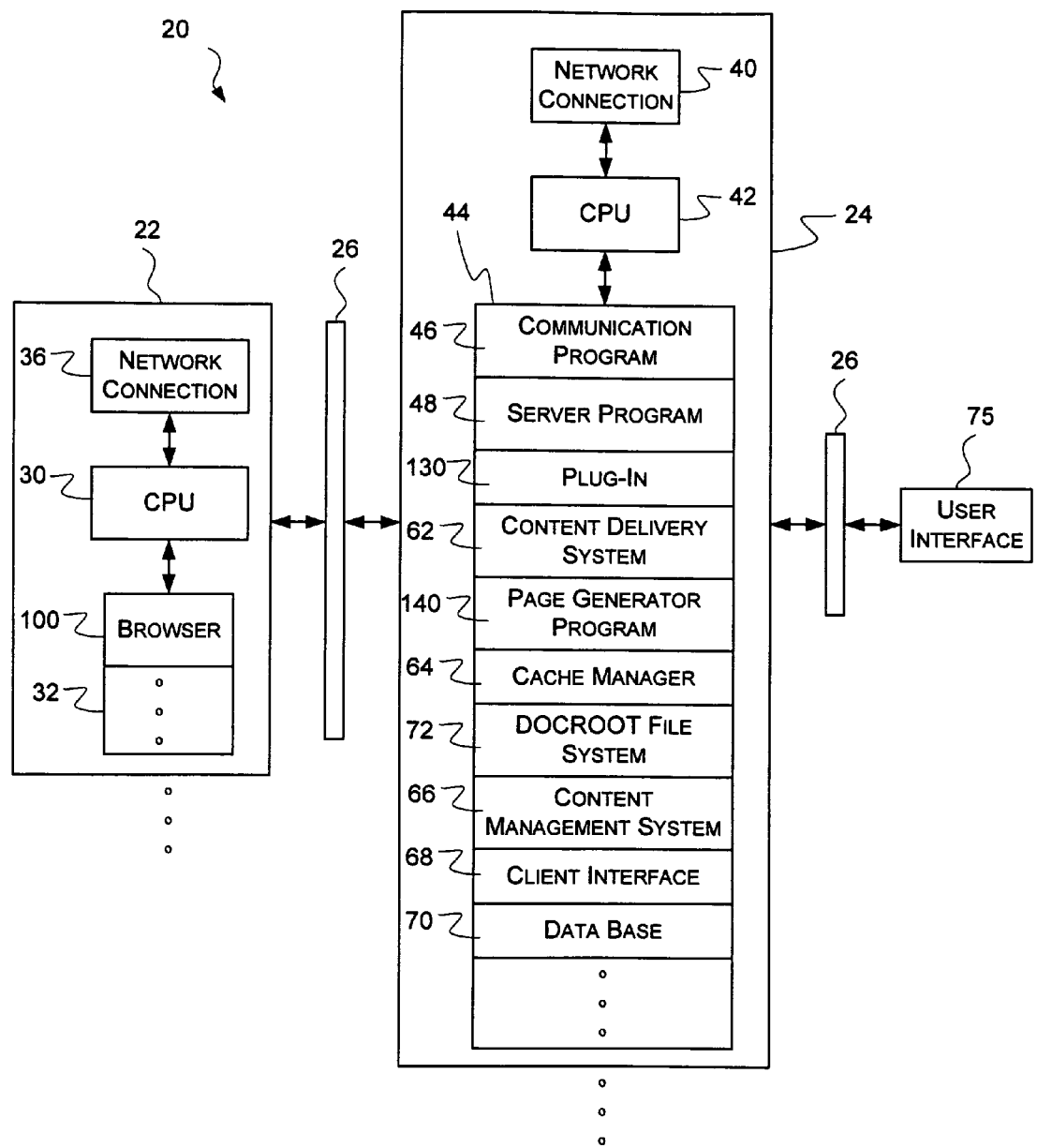
FIG. 2 illustrates a client-server computer network 20 that may be operated in accordance with the teachings of the embodiments of the present invention.

FIG. 2 illustrates a client-server computer network 20 that may be operated in accordance with the teachings of the embodiments of the present invention. Network 20 includes at least one client computer 22 and at least one server computer 24. Client computer 22 and server computer 24 can be connected by transmission channel 26, which may be any wire or wireless transmission channel, including a fiber optic transmission channel.

Client computer 22 can be a standard computer, including a central processing unit ("CPU") 30 connected to a memory (primary and/or secondary) 32. Memory 32 can comprise any combination of RAM, ROM and/or a magnetic storage device such as a hard drive. Memory 32 can store a number of computer programs, including a "web browser" 100, as known to those in the art. Web Browser 100 can be used to communicate with remote server computer 24 and to visually present the information received from server computer 24. Client computer 22 can establish network communications through a standard network connection device 36. Network connection device 36 can be any network connection device as known to those in the art. Server Computer 24 can be, for example, web server 120 shown in FIG. 1.

Server computer 24 can include standard server computer components, including a network connection device 40, a CPU 42, and a memory (primary and/or secondary) 44. Network connection device 40, CPU 42, and memory 44 can be equivalent components to network connection device 36, CPU 30, and memory 32 of client computer 22. Memory 44 can store a set of computer programs (computer-executable software instructions) to implement the processing associated with this invention.

As shown in FIG. 2, memory 44 can store a standard communication program 46 to realize standard network communications. Memory 44 can also store a standard server program 48. Server program 48 can be a standard HTTP software web server program, such as NCSA from the National Center for Supercomputing Applications, Champaign, Ill., or Apache™ from Apache HTTP Server Project, Lincoln, Nebr.

In accordance with the embodiments of the present invention, standard server program 48 can be instructed to make a call to plug-in 130. Standard HTTP server programs can include a feature that allows another program to be called when a certain condition is satisfied. In this case, plug-in 130 is called by server program 48 when server program 48 receives a request for a standard filename, instead of a request for a previously cached customized filename.

When invoked by server program 48, plug-in 130 can map the requested standard filename to a customized file request as per the teachings of the Caching Application and the Cache Management Application (i.e., into a custom uniform resource locator ("CURL")). The customized file request can further include locale-specific attributes associated with locale-specific versions of cached content. The customized file request can be implemented as a combination of the initial standard filename and a selected attribute of the computer user requesting the file such that the attribute can specify the format capabilities of client computer 22.

Memory 44 can also store a page generator program 140. Page generator program 140 can be invoked when the customized file request cannot be matched to an existing set of cached customized locale-specific files stored on, for example, server computer 24. In the embodiments of this invention, plug-in 130 can invoke page generator program 140 when a user request is received for a customized content (page) that has not been cached. When invoked by plug-in 130, page generator program 140 can create a customized file corresponding to the customized file request including the user's locale preferences. Page generator program 140 can thus generate a customized file in response to the file request from client computer 22. The customized file created by page generator program 140 of server computer 24 can be forwarded to and stored (cached) by plug-in 130. Server program 48 can pass the contents of the customized file to client computer 22.

Memory 44 can also store content management system ("CMS") 66 and database 70, that together can be used to create, test, modify and manage stored content templates and other content that can be made available to page generator program 140. Content management system 66 can also be used to manage metadata associated with the content templates used to dynamically generate content, such as locale-specific metadata. Client interface program 68 is associated with and interfaces with CMS 66. Client interface program 68 can be the interface program to CMS 66 for developing content templates. Client interface program 68 can also be used for modifying and deleting content templates.

Client interface program 68 can be a Java-based interface and can be stored in memory 44, server 24, or at another server location. Client interface program 68 can be called via user interface 75, which is communicatively connected to server 24 (or to any other server on which client interface program 24 is stored) by a second transmission channel 27. User interface 75 can be a graphical user interface accessed by a keyboard and/or mouse and viewed on a computer monitor. User interface 75 can also be another user-to-computer interface as known to those in the art. User interface 75 can be situated locally or remotely to server 24. User interface 75 can call client interface program 68 (i.e., access the server storing client interface program 68) over transmission channel 27. Transmission channel 27 can be a direct connection or a network connection such an Internet connection. Database 70 can likewise be stored within memory 44 of server 24 or at another server location. Database 70 can be a standard relational database. Memory 44 can also store cache manager 64, which can provide the cache management functionality of the present invention.

According to the teachings of the present invention, if the contents of a template (i.e., the contents of a dynamically-generated locale-sensitive page) were changed, for example, by a human user via user interface 75 and client interface program 68 to CMS 66, logically the content that has been previously generated from that template will be outdated. Automatic regeneration, as previously discussed, may be desirable in such a case. When a template is changed, cache manager 64 is called and can access docroot file system 72 to identify all the currently cached files that were generated from the now altered template. It should be noted that cached files can also be stored in a memory-based, rather than a persistent file-based, cache repository. In such a case, docroot file system 72 can represent a filing system for a memory-based cache repository.

The locale-sensitive content files generated from the now altered template are identified by cache manager 64 so that they can be regenerated from the new version of the template. Cache manager 64 can identify locale-sensitive files by use of the customized filename discussed herein. In one embodiment of the method and system of this invention, previously cached files can be selected for regeneration based on some arbitrary criteria, such as territory or language encoding, such that not all affected files are regenerated.

The process of replacing previously cached pages (files) with updated versions can occur, according to the teachings of this invention, in response to a regeneration event. A regeneration event can comprise, for example, a user change to a template affecting previously cached locale-sensitive customized files, an explicit flushing operation, or a change to the contents of a customized locale-sensitive file. A flushing operation is a process by which some or all previously caches files are made inaccessible (e.g., by renaming) to a user request, but may still be on the server system and accessible to a page regeneration system for the purposes of, for example, backup in case of an error (i.e., the content is logically deleted). A flushing operation can, alternatively, also comprise physically deleting the affected content. A flushing operation can thus comprise any such action that is used to reduce the accessible content population in a cache. Flushing operations initiated via client interface 75 and client interface program 68, and their interaction with one another, with CMS 66 and page generator 140 are more fully described in the Cache Management Application.

Cache manager 64 can initiate the page regeneration aspects of the embodiments of the present invention in response to the notification from CMS 66 that a template has been changed. Cache manager 64 is a single process physical concept that can comprise a software program (computer-executable software instructions) that can reside on the same server as CMS 66, or that can reside on a different server 24. Cache manager 64 must be configured so as to be able to access docroot file system 72. Docroot file system 72 can be a file system that may reside on server 24 (stored in memory 44) and can be on the same server 24 as cache manager 64. Cache manager 64 and docroot file system 72 may thus be co-resident on a single machine. They can, however, also reside on different servers 24, depending on the network topology. Docroot file system 72 can be shared between cache manager 64 and its associated server 24, regardless of whether cache manager 64 is located within the same server 24. The dynamically-generated locale-sensitive content of this invention can be cached in docroot file system 72. Because docroot file system 72 stores the customized content (or content components) and is a file system shared between server 24 and cache manager 64, both server 24 and cache manager 64 can have access to the files in docroot file system 72. Docroot file system 72 can be updated to track changes resulting from regenerating previously cached locale-sensitive customized content and replacing the superseded content.

Locale-sensitive dynamically-generated content can be cached in a variety of network locations. If, however, the content is cached in a docroot file system 72 on the server 24 where web server program 48 is running, cache manager 64 must also be running on the same server 24, or on another server 24 that has direct access to docroot file system 72. Similarly, docroot file system 72 can be located on a server 24 other than the one on which web server program 48 is located, but web server program 48 must have direct access to docroot file system 72. A typical configuration has web server program 48, docroot file system 72, and cache manager 64 residing on the same server 24.

The embodiments of the method and system of this invention can improve network performance over prior art systems following a regeneration event. Unlike in prior art systems, outdated customized locale-sensitive content need not be deleted from a cache before a replacement is generated. Thus, a network system implementing this invention will not be overloaded by multiple page regeneration requests in the event that multiple client requests for a recently deleted page are simultaneously received. Although a computer system implementing an embodiment of the method of this invention, upon replacing superseded cached content with a current version, can still expect to experience a slight decrease in network performance in the event that a large number of requests for a cached page occur simultaneously, this delay is moved outward to web server 48 and does not result in a decrease in the performance level of CMS 66. The delivery environment of a network system implementing an embodiment of the present invention can be designed to incorporate a greater number of web servers to handle this anticipated load.

In particular, the embodiments of the method and system of the present invention provide a further advantage in a situation where changing a page template affects a family of customized pages generated from the modified template (i.e., locale-sensitive versions of the content generated from that template). A number of different variations of a page (content) can be generated from the same template based on, for example, the language or territory requested by a user. In addition to language-specific versions of a page, different versions of a page for each language can also be generated from the same template based on the capabilities of the user's browser (e.g., different versions of the same language content may be generated and cached because they may render differently on different browsers). In this way, the embodiments of the method and system of this invention can identify and retrieve different locale-sensitive versions of a content from a database, such as relational database 70, to serve to users different versions of, for example, the same language content based on other locale-specific parameters.

Further, following a regeneration event, it may not be desirable to regenerate every version of an affected content. For example, some versions of an outdated locale-sensitive content may not have been accessed in a long period of time and thus are considered high-latency (low request) content. The embodiments of the method and system of this invention can incorporate threshold criteria for arbitrary parameters that can be used to control which pages are regenerated following a regeneration event. In this way, for example, certain language versions (e.g., Burmese) that may not be accessed on a regular schedule need not be regenerated each time a regeneration event occurs. Instead, these versions of the content can be regenerated upon a subsequent request by a user for that locale-specific content.

Once an affected customized content has been selected for regeneration, the embodiments of the method and system of this invention can extract pertinent parameters for regenerating the customized page from the page's custom cached filename, which identifies, in particular, the locale-specific preferences of the user. For example, language, territory, and currency format, as well as browser options, can be determined from the cached filename. This information can be supplied to page generator program 140 by cache manager 64 when requesting a new version of the content. In this way, the embodiments of the method and system of this invention can ensure that a new version of the locale-sensitive content will be regenerated according to the same specifications as the superseded content it will replace while also incorporating the changes made to a template, if any.

A key advantage of the embodiments of the method and system of this invention is the ability to regenerate cached pages based on locale-specific parameters. From the perspective of a content provider implementing an embodiment of this invention, a further advantage is the ability to cache locale-sensitive content in separate directories. For example, a typical content provider may initiate a regeneration event by, for example, completely flushing a selected language directory, for example a Chinese language cache directory. Therefore, the next time a Chinese user requests content from the provider's website, the user will get a cache miss (because the requested content is no longer cached) and the system will recreate the dynamically-generated locale-sensitive content requested by the user. This ability to separate locale-sensitive content into separate directories can provide a content provider the ability to, for example, "view" separate language directories of cached content and compare and contrast the different language versions to determine which versions are getting the most hits. In this way, content providers can track the demographics of their users and more efficiently provide for updates and, for example, provide targeted advertising to frequent users. Thus, content providers can track statistics by language (or other user parameter) because of the ability to cache content in different directories and the ability to monitor the frequency of use of that content.

Embodiments of the method and system of this invention can comprise the steps of first determining a user's locale (e.g., either by some automatic means or by defaulting the locale) and then representing that locale in the scripting environment as described above. The detected request locale information can then be transcoded to a desired response locale, if desired. A next step can be determining if the requested content is already cached or is cacheable. If the requested content is already cached using the filename format of the embodiments of this invention, the content is retrieved and served to the user. If the content is not cached and is marked as cacheable, then the content is dynamically generated, cached under a locale sensitive filename, and served to the user. If the content is not cached and is also not identified as being cacheable, then it is simply dynamically generated, temporarily stored (cached) and then served to the user.

The steps of the embodiments of this invention can comprise separate computer-executable software instruction applets. In fact, they can be performed in different portions of an overall server system. For example, locale-sensitive caching can be performed, as described above, in a cache management daemon. Aspects of the embodiments of this invention can also perform independently of one another. For example, the cache management system can be provided with an artificial (e.g., content provider specified) locale, as opposed to a detected locale, for purposes of locale-sensitive caching and locale-sensitive regeneration.

Further, web browser plug-in 130 can provide a locale detection process that can be used with the embodiments of this invention for retrieving locale-sensitive cached content. By placing locale detection up front (closer to the user) in the web server, as opposed to the back-end server systems, the content provider's client-server system can determine from where in a cache directory to retrieve the user-requested locale-sensitive content without having to access a back-end user server. Further, a web server-based implementation of an embodiment of this invention can provide for locale-sensitive cache regeneration. The web browser plug-in 130 can provide an input to a cache management system to identify and regenerate a particular cached locale-sensitive page. By moving the automatic locale detection aspect into web server plug-in 130, locale detection also becomes scripting language independent as previously discussed. This is because, once moved upstream to the web server, automatic locale detection determines locale before a request is forwarded in the scripting environment and it is no longer relevant whether a call is made to an ASP, JSP or a TCL scripting environment. All of these environments can thus be provided the benefit of automatic locale detection.

The embodiments of the method and system of this invention thus can interface with and use automatic locale detection and cache management systems to provide locale-sensitive customized filenames for the identification, retrieval and regeneration of locale-sensitive content. The embodiments of the method and system of this invention use a specially named filename substring to associate the cached locale-sensitive content with the appropriate locale to provide for automatic page regeneration and serving of the locale-appropriate cached content to a user. The filename substring format can be arbitrarily determined, but must be consistent and easily identifiable by a cache management system implementing an embodiment of this invention.

Figure 3:
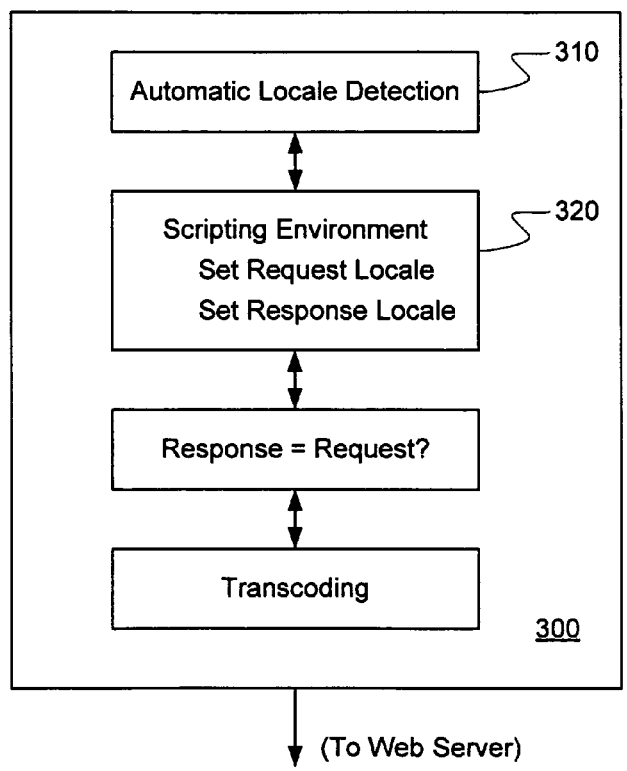
FIG. 3 is a simplified block diagram illustrating the capability of the embodiments of the present invention for transcoding information from a detected request locale to a desired response locale.

FIG. 3 is a simplified block diagram illustrating the capability of the embodiments of the present invention for transcoding information from a detected request locale to a desired response locale. Within page generator 300, automatic locale detection 310 can take place. At the output of automatic locale detection 310, scripting environment 320 is entered with a determined request_locale and a response_locale object set equal at this point. Within the scripting environment, various tasks can be performed by the scriptor that can lead to the response_locale and the request_locale not being equal. If at the output of the scripting environment, the request_locale object is not equal to the response_locale object, the value of the response_locale object can be used to transform (transcode) the content that will be served to the user's browser (i.e., to transform the content to the response_locale object preferences). This is a powerful feature because it allows a scriptor to change the encoding of bytes that leave the page generator and returned to a web server for serving to a user's browser. In this way, as in the example previously described for an Australian website serving content to a locale that has been determined to be in the U.S., the content served to a user can be changed in the page generation environment from a detected user locale preference based on manipulations occurring in the scripting environment. Content can thus be changed to, for example, ensure proper locale formatting occurs in an ambiguous situation.

The transcoding content aspect of the embodiments of this invention can occur in the page generator, as opposed to the scripting environment or the automatic locale detection process. In this way, the embodiments of the method and system of this invention can provide the capability for driving dynamic transcoding on the output side of the scripting environment.

The embodiments of the present invention can be used to capture various aspects of a user's locale, including language, territory, encoding, sort order, and time zone, and whether or not these components are defaulted by server-side programs or explicitly specified by a requesting client, which may have an impact on locale-sensitive page generation. Locale referenced information is captured in the locale-sensitive caching schema of the embodiments of this invention to ensure the correctness of cached page retrieval, as well as cached page regeneration, in case of template changes or other types of events that result in flushing of cached locale-sensitive pages.

In accordance with the teaching of the embodiments of the method and system of this invention, a cached page's docroot identification (i.e., its file specification) can have embedded locale information (e.g., language, territory, encoding, sort order, etc.) that can be used to identify the cached content as a locale-specific content. The process selecting docroot cached files for display can thus look for the locale-specific cached file based on the detected (or provided) user locale. Locale-sensitive page caching can be a critical performance feature in a multi-lingual website, dependent upon the amount of dynamic page generation and site experiences. Further, embodiments of this invention can be used to provide for caching and regeneration of content based on criteria other than locale. For example, user specific (as opposed to locale-specific) information can be captured and incorporated into the filename specification of the embodiments of this invention. Additional such embodiments are contemplated to be within the scope of this invention.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the spirit and true scope of this invention as claimed below.

What is claimed is:

1. A method for cache management and regeneration of dynamically-generated locale-sensitive content ("DGLSC") in one or more server computers within a client-server computer network, comprising the steps of:
   receiving a first request for a web page from a first user at a client computer via a web browser;
   determining said first user's locale preference with an automatic locale detection algorithm, wherein a locale corresponds to at least a geographic region;
   dynamically generating a first set of content for the requested web page from a template as a first DGLSC based on said first user's locale preference;
   receiving a second request for the web page from a second user having a second user's locale preference;
   dynamically generating a second set of content for the requested web page from the template as a second DGLSC based on the second user's locale preference instead of the first DGLSC;
   if said template is marked as cacheable to indicate that content generated from said template should be cached:
      generating a first locale-sensitive filename for said first DGLSC based on said first user's locale preference and associating said first DGLSC with said first locale-sensitive filename;
      generating a second locale-sensitive filename for said second DGLSC based on said second user's locale preference and associating said second DGLSC with said second locale sensitive filename;
   caching said first DGLSC in at least one server computer in a locale-sensitive directory to be served in response to subsequent requests having the same locale preference as the first user's locale preference and caching the second DGLSC in the locale-sensitive directory to be served in response to subsequent requests having the same locale preference as the second user's locale preference; and
   serving said first DGLSC to said first user at said client computer; and
   serving said second DGLSC to said second user.

2. The method of claim 1, wherein said first locale-sensitive filename comprises coded information associated with said first user's locale preference.

3. The method of claim 1, wherein said first locale-sensitive filename comprises metadata arranged in an encoded format, said metadata representing a detected locale.

4. The method of claim 1, wherein said first locale-sensitive filename comprises one or more attributes, said one or more attributes designating language, territory, type of encoding, type of sorting, locale origin, sort order, or a combination thereof.

5. The method of claim 1, further comprising managing metadata associated with said template.

6. The method of claim 1, further comprising creating and storing said template.

7. The method of claim 1, further comprising regenerating said first DGLSC and said second DGLSC upon one or more changes to said template.

8. A software product embodied in a computer-readable medium carrying program instructions comprising instructions executable by a processor to:
   receive a first request for a web page from a first user at a client computer via a web browser;
   determine said first user's locale preference with an automatic locale detection algorithm wherein a locale corresponds to at least a geographic region;
   dynamically generate said content for the requested web page from a template as first dynamically-generated locale-sensitive content ("DGLSC") based on said first user's locale preference;
   receive a second request for the web page from a second user having a second user's locale preference;
   dynamically generate a second set of content for the requested web page from the template as a second DGLSC based on the second user's locale preference instead of the first DGLSC; and
   if said template is marked as cacheable to indicate that content generated from said template should be cached:
      generate a first locale-sensitive filename for said first DGLSC based on said first user's locale preference and associate said first DGLSC with said first locale-sensitive filename;
      generate a second locale-sensitive filename for said second DGLSC based on said second user's locale preference and associate said second DGLSC with said second locale sensitive filename;
   cache said first DGLSC in at least one server computer in a locale-sensitive directory to be served in response to subsequent requests having the same locale preference as the first user's locale preference and cache the second DGLSC in the locale-sensitive directory to be served in response to subsequent requests having the same locale preference as the second user's locale preference.

9. A computer system comprising a processor in communication with a computer readable medium carrying programming instructions, said programming instructions comprising instructions executable to:
   receive a first request for a web page from a first user at a client computer via a web browser;
   determine said first user's locale preference with an automatic locale detection algorithm wherein a locale corresponds to at least a geographic region;
   dynamically generate said content for the requested web page from a template as first dynamically-generated locale-sensitive content ("DGLSC") based on said first user's locale preference;
   receive a second request for the web page from a second user having a second user's locale preference;
   dynamically generate a second set of content for the requested web page from the template as a second DGLSC based on the second user's locale preference instead of the first DGLSC; and
   if said template is marked as cacheable to indicate that content generated from said template should be cached:

generate a first locale-sensitive filename for said first DGLSC based on said first user's locale preference and associate said first DGLSC with said first locale-sensitive filename;

generate a second locale-sensitive filename for said second DGLSC based on said second user's locale preference and associate said second DGLSC with said second locale sensitive filename;

cache said first DGLSC in at least one server computer in a locale-sensitive directory to be served in response to subsequent requests having the same locale preference as the first user's locale preference and cache the second DGLSC in the locale-sensitive directory to be served in response to subsequent requests having the same locale preference as the second user's locale preference.

10. A method for cache management and regeneration of dynamically-generated locale-sensitive content in a client-server computer network, comprising the steps of:

receiving a first request for content corresponding to a web sage from a first user at a client computer in said client-server computer network;

receiving a second request for the content corresponding to the web page from a second user;

determining said first user's locale, wherein a locale corresponds to at least a geographic region;

determining said second user's locale, determining if a first locale-sensitive version of the content requested by the first user corresponding to the first user's locale is cached and if not:

dynamically generating a first locale-sensitive version of the content based on said first user's locale and in accordance with said first request;

dynamically generating a first locale-sensitive filename for said first locale-sensitive version of the content based on said first user's locale;

caching said first locale-sensitive version of the content under the first locale-sensitive file name in a locale-sensitive directory; and serving said first locale-sensitive version of the content to said first user;

determining if a second locale-sensitive version of the content requested by the second user corresponding to the second user's locale is cached and if not:

dynamically generating a second locale-sensitive version of the content based on said second user's locale and in accordance with said second request;

dynamically generating a second locale-sensitive filename for said second locale-sensitive version of the content based on said second user's locale;

caching said second locale-sensitive version of the content under the second locale-sensitive file name in a locale-sensitive directory; and serving said second locale-sensitive version of the content to said second user.

11. The method of claim 10, further comprising the steps of:

if said content requested by said first user is already cached under said first locale-sensitive filename, retrieving said first locale-sensitive version of the content from a locale-specific cache directory, and serving said first locale-sensitive version content to said user.

12. The method of claim 10, further comprising the steps of:

determining the first locale sensitive version of the content should be cached from a template from which the first locale sensitive version of the content is generated.

13. The method of claim 10, wherein the step of caching said first locale-sensitive version of the content under said first locale-sensitive filename comprises the step of caching said first locale-sensitive version of the content under said first locale-sensitive filename in at least one server computer having a locale-specific cache directory.

14. The method of claim 13, further comprising regenerating said first locale-sensitive version of the content upon one or more changes to said first locale-sensitive version of the content.

15. The method of claim 10, wherein said first locale-sensitive filename comprises coded information associated with said first user's locale.

16. The method of claim 10, wherein said first locale-sensitive filename comprises metadata arranged in an encoded format, said metadata representing said first user's locale.

17. The method of claim 10, said first locale-sensitive filename comprises one or more attributes, said one or more attributes designating language, territory, type of encoding, type of sorting, locale origin, sort order, or a combination thereof.

18. A software product embodied in a computer-readable medium carrying program instructions comprising instructions executable by a processor to:

receive a first request for content corresponding to a web page from a first user at a client computer in said client-server computer network;

receive a second request for the content corresponding to the web page from a second user;

determine said first user's locale, wherein a locale corresponds to at least a geographic region;

determine said second user's locale, determine if a first locale-sensitive version of the content requested by the first user corresponding to the first user's locale is cached and if not:

dynamically generate a first locale-sensitive version of the content based on said first user's locale and in accordance with said first request;

dynamically generate a first locale-sensitive filename for said first locale-sensitive version of the content based on said first user's locale;

cache said first locale-sensitive version of the content under the first locale-sensitive file name in a locale-sensitive directory; and serve said first locale-sensitive version of the content to said first user;

determine if a second locale-sensitive version of the content requested by the second user corresponding to the second user's locale is cached and if not:

dynamically generate a second locale-sensitive version of the content based on said second user's locale and in accordance with said second request;

dynamically generate a second locale-sensitive filename for said second locale-sensitive version of the content based on said second user's locale;

cache said second locale-sensitive version of the content under the second locale-sensitive file name in a locale-sensitive directory; and serve said second locale-sensitive version of the content to said second user.

19. A computer system comprising a processor in communication with a computer readable medium carrying programming instructions, said programming instructions comprising instructions executable to:

receive a first request for content corresponding to a web page from a first user at a client computer in said client-server computer network;

receive a second request for the content corresponding to the web page from a second user;

determine said first user's locale, wherein a locale corresponds to at least a geographic region;

determine said second user's locale, determine if a first locale-sensitive version of the content requested by the first user corresponding to the first user's locale is cached and if not:

dynamically generate a first locale-sensitive version of the content based on said first user's locale and in accordance with said first request;

dynamically generate a first locale-sensitive filename for said first locale-sensitive version of the content based on said first user's locale;

cache said first locale-sensitive version of the content under the first locale-sensitive file name in a locale-sensitive directory; and serve said first locale-sensitive version of the content to said first user;

determine if a second locale-sensitive version of the content requested by the second user corresponding to the second user's locale is cached and if not:

dynamically generate a second locale-sensitive version of the content based on said second user's locale and in accordance with said second request;

dynamically generate a second locale-sensitive filename for said second locale-sensitive version of the content based on said second user's locale;

cache said second locale-sensitive version of the content under the second locale-sensitive file name in a locale-sensitive directory; and serve said second locale-sensitive version of the content to said second user.

* * * * *